Figure 1:
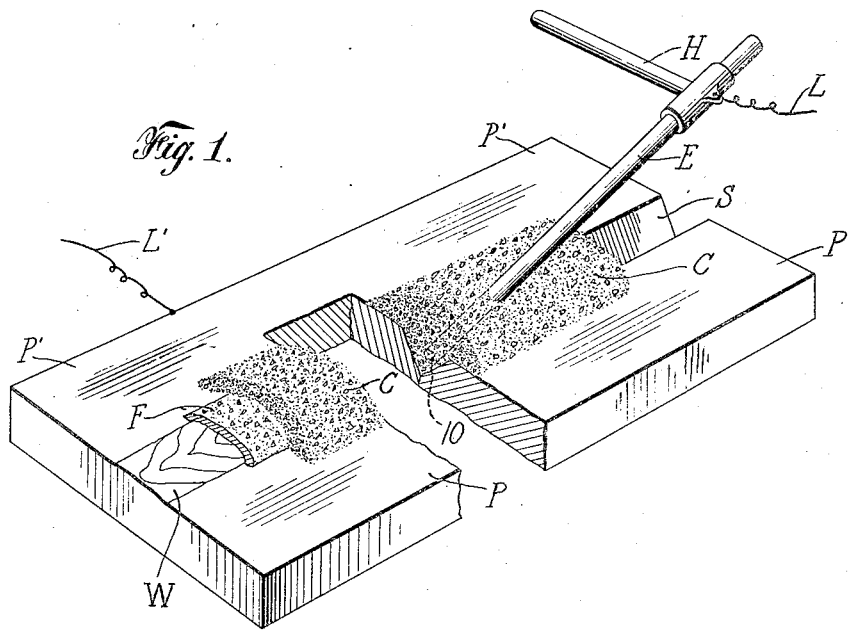

March 10, 1942.  H. E. KENNEDY  2,275,910

METHOD OF WELDING

Filed May 29, 1940

INVENTOR
HARRY E. KENNEDY
BY
ATTORNEY

Patented Mar. 10, 1942

2,275,910

UNITED STATES PATENT OFFICE 2,275,910

METHOD OF WELDING

Harry E. Kennedy, Berkeley, Calif., assignor to The Linde Air Products Company, a corporation of Ohio Application May 29, 1940, Serial No. 337,830

6 Claims. (Cl. 219—10)

There is disclosed in Patent No. 2,043,960 issued June 9, 1936, on application of Lloyd T. Jones, Harry E. Kennedy and Maynard A. Rotermund jointly, a method of electric welding wherein a seam between the opposing edges of objects or work to be welded is overfilled with a welding composition free from gas-forming ingredients, in powdered or granular form, and a welding current of electricity is passed from an electrode or welding wire to the work through the welding composition into which the fusing end of the electrode is inserted. During the welding operation, as the electrode is fed to the work and simultaneously translated along the seam through the welding composition, part of the latter is locally fused at successive portions of the seam, and molten metal of the electrode is deposited in the seam and coalesced with the fused edges thereof to provide a uniformly strong or dense weld. An excess of unfused welding composition is maintained as a blanket over the welding zone.

This method has hertofore been practiced only by machines using welding heads which feed the electrode automatically as the welding progresses. In all such machines there is relative translatory movement between the work and the electrode. The excellent quality of welds produced by this method of welding, as well as other considerations, makes it desirable that the process be made available for use in applications in which installation of automatic welding machinery would be inconvenient or impractical. Portable equipment has been developed which may be used in some of such applications, but even this equipment does not completely satisfy the demand which exists for broadening the field of use of this method of welding.

The production of a satisfactory weld by the method described depends in large part on the position of the electrode in relation to the work. For uniform results of good quality the fusing tip of the electrode should be maintained at a definite distance from the work, otherwise the coalescence of the weld metal with the work will be uneven. Heretofore, this requirement has been satisfied only by the use of automatic equipment, because the welding seam is completely covered by the welding composition, thus making it difficult for the operator visually to observe the position of the electrode tip with respect to the work. Because of the need for precise control of the operation it has heretofore been believed that the method described could not satisfactorily be carried out by hand.

Figure 2:
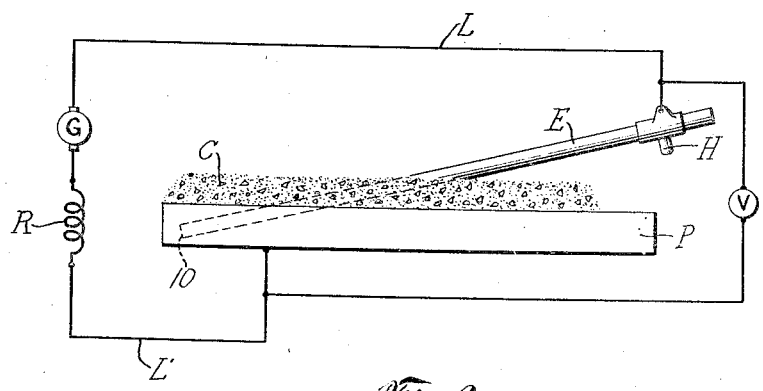

It is a principal object of this invention to provide a manual method of electric welding in which welding composition, conductive when molten but nonconductive when cold, is heaped on the work where metal is to be deposited and the fusing end of an electrode is inserted into the welding composition. In the accompanying drawing:

Fig. 1 is a view, partially in section, of two plates being welded according to the invention; and Fig. 2 is a diagrammatic representation of the preferred position of the electrode in relation to the work to be welded, with an unfused portion of the electrode above an unwelded portion of the seam at an acute angle thereto.

The invention is based on the discovery that the fusing tip of an electrode may be maintained at the proper distance from the work to be welded without visual inspection by holding the electrode at an acute angle to the work in the manner illustrated. In accordance with the invention, welding composition is placed upon the work along the line of intended deposition and a bare wire electrode is held above the center of the line of intended deposition at an acute angle to the work and with its fusing tip embedded in the welding composition. An electric current of suitable strength is supplied to the electrode, and the welding current passes from the electrode to the work through the molten welding composition.

Assuming the work and the electrode to have been set up as described, to begin welding it is necessary to start an electric current from the electrode to the work by an external means because the cold, powdered welding composition is a non-conductor of electricity. One convenient way of starting the welding is to insert a small ball of steel wool between the electrode tip and the work. On supplying a suitable electric current to the electrode, the steel wool is fused, and the temperature reached in its fusion is sufficient to fuse a portion of the welding composition. The fused portion of the welding composition, the "melt," then serves as the conductor of the electric current to the work to be welded. The heat developed in the molten welding composition by the passage of the current fuses the end of the electrode and the edges of the welding seam so that the molten metal from the electrode is deposited on the work and coalesces with the fused portions thereof. As the electrode is held in position by the operator, successive portions of the welding composition are progressively fused, and successive portions of the electrode are fused and coalesced with the metal of the work. A blanket of unfused welding composition is preferably maintained on the welding zone. The electrode is not moved along the line of intended deposition as in the usual methods of manual welding, but it so held that its fusing tip is always completely covered by welding composition. Thus, there is substantially no translatory movement of the electrode with respect to the work.

In practicing the method of the invention the operator may be guided by experience in maintaining the electrode tip at the proper distance from the work, or if desired an appropriate indicating device may be used. For example, in the conventional welding circuit a voltmeter may be connected across the electrode and the work. Since the IR drop across the electrode tip and the work varies as the distance between the electrode tip and the work, the operator may maintain this distance substantially constant by adjusting the position of the electrode to maintain a substantially constant reading on the voltmeter, thereby obviating the need for visual inspection of the actual welding. If the voltage, as indicated by the voltmeter, is higher than desired, the fusing tip of the electrode is pressed more firmly towards the work and, conversely, if the voltage is lower than desired, the pressure urging the fusing tip of the electrode towards the work is relaxed by the operator. By this method it is easy to control the voltage at the welding zone within suitable limits.

Another, and preferred, way of maintaining the voltage substantially constant at the welding zone is by changing the angle at which the electrode is held to the work. Since the unfused welding composition underlying the electrode acts as a fulcrum, this angle may be changed by depressing the electrode holder, thereby making the angle more acute, or by raising it, thereby making the angle less acute. As the angle is made more acute, the distance, and therefore the voltage, between the fusing tip of the electrode and the work are increased. Similarly, if the angle is made less acute, the voltage is decreased The welding operation may be successfully carried out if the angle is as great as 45° or more, but ordinarily it becomes more difficult to control as the angle exceeds 45°. On the other hand, no matter how acute the angle employed, there is no danger of short circuiting the electrode and the work because the unfused welding composition which completely covers the work along the line of intended deposition is an electrical insulator.

Instead of using a voltmeter in the circuit, voltage or current-responsive audible means such as a buzzer or bell may be suitably connected in the welding circuit to indicate fluctuations in welding voltage or current.

In Fig. 1 of the drawing, the method of the invention applied to the butt-welding of two plates, P, P' is illustrated. The weld is being made toward the right in the view shown, and the completed portion W of the weld is shown at the left. A layer F of fused welding composition covers a portion of the finished weld and is in turn covered by a layer of unfused welding composition C. To the right, where the welding operation is in progress in a welding zone, the fusing tip 10 of a bare electrode E is nested in a welding seam S between the plates P, P' and is entirely covered with welding composition C. As shown, the welding seam S is overfilled with welding composition C.

A suitable electrical circuit and the position of the electrode E with respect to the work being welded are shown diagrammatically in Fig. 2. The electrode E is desirably held by means of a holder H and is connected to a source of current such as a generator G by a lead L while the work is connected through a reactance R to the current source by a lead L'. A voltmeter V is connected across the electrode and the work.

The electrode holder used may be fixed to the end of the electrode E or may be slidably mounted so that it may be adjusted along the length of the electrode as the welding proceeds.

In the practice of the invention it is possible to employ the same welding currents that are usually employed in automatic welding by the method disclosed in Patent No. 2,043,960. Preferably, alternating current is employed, but direct current may be used. Welding speed is primarily controlled by the welding current, and the voltage is controlled primarily by the diameter of the electrode used. For example, steel plate ½ inch in thickness may be welded at a speed of about 12 inches per minute using a bare wire electrode ½ inch in diameter, a welding voltage of about 34 volts, and a welding current of about 1,000 amperes. Welding currents as high as 2,700 amperes or more may be employed. Small fluctuations in the current used have little effect on the quality of the weld produced but do affect the speed of welding.

Any of the welding compositions disclosed in Patent No. 2,043,960 may be employed in the method of this invention. For example, a suitable welding composition preferably comprises as its principal ingredients silica, at least one basic constituent consisting of an alkaline earth such as lime or magnesia or a mixture thereof, and alumina. The acidic and basic constituents of the welding composition should be reacted, the composition should be substantially anhydrous and free from gases, and all reactions which would evolve deleterious amounts of gases during welding should be substantially completed before the composition is used in the welding process. These conditions may be suitably attained by prefusing a mixture of the constituents, preferably in an electric furnace.

A particular advantage of the method of the invention is that the deposit produced ordinarily contains substantially the same amount of metal per foot as there is contained in the electrode per foot. For this reason, in welding plates up to about ½ inch in thickness a welding electrode of the same diameter as the thickness of the plate is suitably used. For plate thicker than ½ inch, welds are conveniently made in more than one pass. It is possible, however, to produce a deposit, containing more metal per foot than is contained in the electrode per foot by holding the electrode to the work at an angle less acute, say in the neighborhood of 45°.

The process of the invention is particularly well suited for the making of fillet joints because of the feature that the deposit produced contains substantially the same amount of metal per foot as the electrode. This makes it possible, where a fillet weld having a specified volume of metal per unit of cross-sectional area is required, to select an electrode of such dimensions as to contain that volume of metal per unit of cross-sectional area. When this is done, the requirements as to the size of the welding bead produced and the amount of metal deposited are automatically fulfilled. Accordingly, no reliance need be placed on the skill of the operator in producing fillet welds.

The method of the invention should not be confused with a prior method of electric welding to which, at first glance, it appears to be quite similar. In that prior method a heavily coated electrode is laid on a welding seam or maintained at an acute angle to it. An open arc between the end of the electrode and the work is maintained and the voltage is automatically held constant. According to the present invention, a bare electrode is used, no open arc is formed, and the voltage at the welding zone is under control of the operator. Accordingly, the present invention possesses many advantages over the prior method.

While in this description specific examples of methods and means for carrying out the invention have been described in detail, these examples are given by way of illustration merely, and the invention is not limited thereby. Moreover, it will be evident that the process of the invention is not limited to any particular type of operation such as the preparation of butt joints or fillet joints, but is well suited to other operations, for example the building up of surfaces or the repair of castings.

I claim:

1. A method of welding which comprises depositing molten metal from a bare electrode onto a metal workpiece under a deep blanket of unfused mineral-like material and through a conductive layer of fused mineral-like material by passing an electric current through said electrode, conductive layer and workpiece while maintaining said electrode at an acute angle to said workpiece and substantially free from translatory movement along the line of deposition, and, by varying the angle at which the electrode is held with respect to the workpiece, adjusting the distance between the fusing end of said electrode and the workpiece in accordance with changes in the voltage drop between said electrode and workpiece.

2. A method of welding which comprises blanketing a portion of a metal workpiece on which metal is to be deposited with a deep layer of a granulated refractory material capable of fusion in situ and electrically conductive when fused, inserting an end of a bare metal electrode in said material, fusing a portion of said material in contact with said electrode end but maintaining a deep blanket of unfused material over the fused portion, and passing an electric current through said electrode, fused portion and workpiece of sufficient strength progressively to fuse successive portions of said material and said electrode and to cause molten metal from said electrode to be coalesced with adjacent fused portions of said workpiece, maintaining said electrode at an acute angle to said workpiece and substantially free from translatory movement along the line of deposition, and maintaining practically constant the rate of fusion of said electrode by varying the said angle in response to changes in the voltage drop between the electrode and the workpiece.

3. A method of depositing molten metal upon a metal workpiece which comprises establishing along the line of intended deposition on said workpiece a deep layer of a granulated refractory material capable of fusion and electrically conductive when fused, inserting an end of a bare metal electrode in said layer, fusing a portion of said material in contact with said electrode end, passing an electric current through said electrode, fused portion and metal workpiece of sufficient strength progressively to fuse successive portions of said material and said electrode and to cause molten metal from said electrode to be deposited along the line of intended deposition on said workpiece under a blanket of unfused material while maintaining said electrode at an acute angle to said intended line of deposition and free from translatory movement along the line of deposition, and maintaining practically constant the rate of fusion and deposition of said electrode by changing the said angle in accordance with changes in the voltage drop between the electrode and the workpiece.

4. A method of weld-uniting metal members which comprises juxtaposing the members to be united to form a groove; overfilling the groove so formed with granulated refractory material conductive when molten but nonconductive when cold; inserting an end of a bare metal electrode in said material; fusing a portion of said material in contact with said electrode end but maintaining a deep blanket of unfused material over the fused portion; and passing through said electrode, fused portion, and metal members an electric current of sufficient strength progressively to fuse successive portions of said granulated material and to cause successive portions of said electrode to melt and be coaleced with the metal of said groove, while maintaining said electrode at an acute angle to said members and substantially free of translatory movement along the line of deposition, and maintaining practically constant the rate of fusion and deposition of said electrode by changing the said angle in accordance with changes in the voltage drop between the electrode and the workpiece.

5. A method of electric welding which comprises depositing molten metal from a substantially straight bare electrode onto a metal workpiece under a deep blanket of unfused mineral-like material and through a conductive layer of fused mineral-like material by passing an electric current through said electrode, conductive layer and workpiece while manually maintaining said electrode at an acute angle to said workpiece and substantially free from translatory movement along the line of deposition, and, by varying the angle at which the electrode is held with respect to the workpiece, adjusting the distance between the fusing end of said electrode and the workpiece in accordance with changes in the voltage drop between said electrode and workpiece.

6. A method of depositing molten metal in a welding seam which comprises overfilling such seam with a granulated refractory material capable of fusion in situ and electrically conductive when fused, inserting an end of a bare substantially straight metal electrode in said material, fusing a portion of said material in contact with said electrode end but maintaining a deep blanket of unfused mineral-like material over the fused portion, and passing an electric current through said electrode, fused portion, and seam, whereby progressively to fuse successive portions of said material and said electrode and to cause molten metal from said electrode to be deposited in said seam while manually maintaining said electrode at an acute angle to said seam and substantially free from translatory movement along the line of deposition, and changing the acute angle included between the fusing end of said electrode and said seam in accordance with changes in the voltage drop across said electrode and said seam, increasing said angle to offset increases in said voltage drop and decreasing said angle to offset decreases in said voltage drop.

HARRY E. KENNEDY.